United States Patent [19]
Devitt

[11] 3,785,868
[45] Jan. 15, 1974

[54] ZINC ELECTRODE
[75] Inventor: John L. Devitt, Denver, Colo.
[73] Assignee: The Gates Rubber Company, Denver, Colo.
[22] Filed: Nov. 20, 1970
[21] Appl. No.: 91,545

[52] U.S. Cl. .................................................. 136/30
[51] Int. Cl. ............................................. H01m 43/02
[58] Field of Search ............ 136/30–31, 95, 102, 125, 136/126, 6, 24, 20, 9, 28–29, 64, 74–75

[56] References Cited
UNITED STATES PATENTS

| 3,261,715 | 7/1966  | Solomon et al. | 136/31 X |
| 3,580,740 | 5/1971  | James | 136/30 |
| 3,607,437 | 9/1971  | Minagawa et al. | 136/30 X |
| 3,623,911 | 11/1971 | Oswin | 136/83 |
| 3,630,781 | 12/1971 | Rampel | 136/31 |
| 3,226,260 | 12/1965 | Drengler | 136/30 |
| 2,640,864 | 6/1953  | Fischbach et al. | 136/126 |
| 3,287,164 | 11/1966 | Arrance | 136/9 |
| 2,982,806 | 5/1961  | Voss | 136/30 |
| 2,692,904 | 10/1954 | Strauss | 136/30 |
| 2,838,590 | 6/1958  | Garine | 136/30 |
| 2,934,581 | 4/1960  | Dassler | 136/9 |
| 2,988,586 | 6/1961  | Andre | 136/30 |
| 2,771,499 | 11/1956 | Fleischer | 136/24 |
| 2,906,802 | 9/1959  | Andre | 136/6 |
| 2,983,777 | 5/1961  | Yardney | 136/20 |

Primary Examiner—Anthony Skapars
Attorney—Curtis H. Castleman, Jr., Raymond Fink and H. W. Oberg, Jr.

[57] ABSTRACT

A pasted zinc electrode for use in an alkaline battery cell is described in which a plating additive is incorporated into the electrode either as a coating on a suitable electrically conductive substrate, or as a portion of the zinc paste formulation. The paste mixture contains a major portion of an active zinc material, and a source of mercury for gassing and corrosion inhibition. Enough vehicle is employed in the paste so that when dried the electrode active material is porous. The combination of the porous zinc active material, use of the plating additive, and the use of excess zinc in the paste material provides an active substrate surface in which zinc dendritic growth is minimized and localized preferentially within the interior body of the negative electrode. The negative plate is useful in alkaline electrolyte-containing secondary cells.

8 Claims, No Drawings

ZINC ELECTRODE

BACKGROUND OF THE INVENTION

This invention relates to zinc containing anodes, and more particularly to alkaline primary and secondary battery cells containing the same. The most pertinent prior art may be found in U.S. Pat. Office Classification 136, Sub-class 30.

It has long been recognized that the use of a zinc containing negative electrode coupled with oxides of nickel, silver, and manganese, or other more electropositive suitable material has a number of advantages over commonly employed negative electrode materials such as cadmium. Among these advantages realized by the use of zinc containing negative electrodes compared with other alkaline couples include relatively high energy density, higher discharge voltages, and relatively low cost. However, it is also well known that conventional zinc electrode containing cells suffer from the phenomenon of dendritic growth or "treeing" in which crystalline conductive branches are produced and propagated from the zinc electrode plate during charge, producing tree-like conductive branches extending to the positive plate, oftentimes shorting out the cell and significantly altering its useful life.

Attempts to minimize dendritic growth in zinc containing cells have met with varying degrees of success. The use of a starved electrolyte condition has generally been regarded as beneficial. Additives, particular separators and special controlled methods of charge have also been employed to retard dentritic growth with more or less success. However, there have seemingly been few efforts to retard this dendritic growth at its source--the zinc plate.

It is taught in *Proceedings of the 20th Annual Power Sources Conferences*, 1966, pages 123–126, that negative plate porosity may have an effect on the diffusion of zincate ions through the negative plate and that zincate ions are the source from which zinc dendrites are formed. The use of excess zinc material in the negative plate has also been disclosed, but generally in the form of the zinc oxide, or small amounts of metallic zinc to impart structural integrity to the plate (See for instance, U.S. Pat. No. 2,865,974 to Scheuerle, et al.). It is one object of this invention to overcome disadvantages of the prior art and provide a zinc containing negative plate construction which retards, localizes and minimizes the growth of zinc dendrites therethrough.

It is also an object to provide a novel electrode substrate for the zinc plate which is substantially active over its entire surface.

It is another object to provide a paste mixture to be applied to the negative plate substrate whose composition minimizes dendritic growth and provides for repeated cycling of the cell and maintenance of a high discharge capacity.

It is still another object of the invention to provide plating additives for the negative electrode which help retard gassing of the cell and provide an active substrate surface for uniform, substantially non-dendritic plating of zinc at the negative electrode.

These and other objects of the invention will be met and the disadvantages of the prior art overcome by the present invention which is more fully described hereinafter.

SUMMARY OF THE INVENTION

Briefly described, the negative electrode of the present invention comprises an electrically conductive substrate compatible with alkaline electrolyte, and a zinc paste mixture applied to the substrate comprising a major proportion of metallic zinc in stoichiometric excess of at least two times that amount required to react with the positive material, optionally an oxidation product of zinc for a charge reserve, and a minor amount of a mercury compound to increase the hydrogen overvoltage and minimize corrosion coupling. A desirable plating additive is either included in the zinc active paste mixture or directly applied to the substrate as a coating, and is substantially soluble in the alkaline electrolyte. A vehicle is added to the paste mixture, and thereafter driven off to form a highly porous active negative. The use of this porous structure, excess zinc and plating additive co-act to significantly retard dendritic growth at the negative plate.

Battery cells utilizing the negative plate configuration of the present invention may be used in place of conventional nickel-cadmium or similar cells for nearly all of its applications, including use in portable instruments such as ohm meters, oscilloscopes, in communications equipment and in photographic equipment. The novel zinc plate has particular utility in sealed or resealably safety-valved secondary battery cells, the cell being operable in any desired position.

PREFERRED EMBODIMENTS OF THE INVENTION

1. Substrate

The substrate typically may be a thin sheet or flat grid structure such as woven wire screen, perforated sheet metal, et cetera, or expanded mesh to which an active zinc paste mixture may be applied. The substrate should be compatible with electrolyte, be electrically conductive, and should provide a long-lasting base onto which the zinc-active material remains firmly in electrical contact, electrochemically active and reversible throughout the life of the battery. It is further important that the material used for the substrate be compatible with the positive electrode of the system.

Examples of preferred substrate materials useful in the present invention include iron, steel, silver, titanium, copper, brass, bronze, platinum, palladium and nickel. Compatible alloys may be employed. The most preferred metals and iron and steel.

It is sometimes found that the outer edges of the substrate tend to become exposed, either through the action of the paste surface tension during its application, or through handling during assembly. As will be discussed more fully hereinafter, it is important that a thickness of covering of active material exists substantially over the entire substrate. Thus, it is one embodiment of this invention to coat the edge of the substrate with an electrolyte resistant coating to render the edge inert. Alternatively, the coated substrate or pasted substrate may be edge coated. A number of suitable materials may be employed including alkaline resistant resins exemplified by tetrafluoro-ethylene resins, plastic latexes such as polyvinyl chloride latex and butadiene-styrene latex and other polymeric materials exemplified by polyolefins and polystyrene. A water-based latex paint application may be advantageously employed.

2. Plating Additive

The plating additive is believed to render the substrate surface active uniformly over its surface, depress hydrogen evolution and to greatly discourage zinc dendritic growth by what is believed to be a mechanism which tends to equalize the activity of the substrate surface and thus avoid localized clumping of zinc trees. Without the plating additive, the substrate tends to passivate or become inactive by forming an oxide layer which is more insulative in nature than conductive, with an attendant loss in cell capacity.

The plating additive should be a material more noble than zinc but have an oxidation potential in the approximate range of zinc so both materials can be co-deposited upon charge. Furthermore, the plating additive should have a high hydrogen overvoltage (See *Electrochemical Kinetics*, Vetter, Academic Press, 1967, especially pages 537–540). A further requirement of the plating additive is that under the conditions of cell operation, it is in a form substantially soluble in the electrolyte and compatible with the rest of the cell environment. Thus, the oxide of the plating additive should be appreciably soluble in potassium hydroxide as well, since the oxidation agent oxygen is present at the negative electrode for recombination. Examples of useful plating additives include lead, tin, indium and thallium. The most preferred materials are lead and tin. For a discussion of plating additives, see *Journal of the Electrochemical Society*, Vol. 117, No. 9, pages 1154–1155. Suitable alloys of these materials such as lead-indium, lead-tin-indium, lead-tin and lead-indium are also suitable in various percentages of composition.

The plating additive may be admixed with the paste mixture in the form of a compatible tin or lead compound, or more preferably is applied in metallic form directly as a coating on the substrate material. Conventional coating processes are useful, including electroplating, immersion plating, electroless plating, or in some cases hot dipping. Electro-deposition is usually preferred.

The coated substrate may be amalgamated. Any conventional process may be employed, such as chemical amalgamation in an acetic acid/mercuric acetate bath, immersion dipping in mercuric oxide saturated with potassium hydroxide or electroamalgamation. It should be understood that the presence of a mercuric reducible compound in the paste mixture is usually sufficient to provide a source of mercury and further amalgamation of the coated substrate is generally not necessary.

Dendritic growth may be further retarded by employing any compatible brightening or leveling agents in the electrode plate or electrolyte. In this manner, rounded or nodular projections of zinc metal will be formed upon charge in favor of the crystalline, tree-like dendrites.

3. Applying the zinc active material

The substrate is made active with a uniform bonded layer or covering of the zinc-active material, preferably by securely applying a paste mixture to the substrate. The dry ingredients of the paste formulation are comprised preferably of from about 25 to about 99 and more preferably of from about 35 to 85 weight percent of metallic zinc, preferably (though not absolutely necessary) from about 10 to about 60 weight percent of an oxidation product of zinc, e.g., zinc oxide, and preferably a mercury compound such as mercuric oxide or metallic mercury in an amount usually not to exceed about 15 weight percent of the mixture. These components can be admixed with a suitable binder, such as an aqueous solution of sodium carboxy methyl cellulose and blended into a smooth paste. Other suitable binders such as polyvinyl alcohols and polyacrylamides may be employed. KOH may also be employed. A suitable vehicle such as water, acetone, alcohol or toluene and the like may be used to render the mixture pliant.

Based on the amount of cathode material in the cell, preferably at least about two times, more preferably at least about four times and most preferably in the range of from five to about ten times the stoichiometric amount of metallic zinc based on the active positive material is employed in the formulation Enough zinc should be present to insure that a substantially unoxidized zinc layer remains after complete discharge of the cell. Although not completely understood, it is believed that this excess boundary layer of zinc is not nearly so conducive to the formation of zincate ions upon discharge as compared with an oxidized form of zinc, e.g., ZnO, which is present in much higher proportions in conventional paste mixtures. A sufficient amount of vehicle is used to render the zinc active paste mass substantially porous upon removal of the vehicle from the paste. It is believed that the resultant porous structure allows percolation of the alkaline electrolyte inwardly toward the substrate surface. During discharge of the cell, oxidation of the zinc-active material then is initiated at or near the surface of the substrate and propagates generally toward the outer surface of the electrode. With an excess amount of zinc, this outward propagation ideally never changes the surface of the electrode plate. Thus, when the charging cycle takes place, reduction, as in the case of oxidation, proceeds outward from the substrate, reducing both solid zinc oxidation products and zincate ions in the space lying generally between the substrate and the layer of unoxidized metallic zinc. Thus, treeing is substantially localized in the interior of the negative plate.

The metallic zinc which accounts for the majority of the paste mixture may be provided in any desired form, although relatively pure zinc in the form of a powder is preferred. Alternatively, zinc may be provided by cathodically reducing zinc oxide to sponge zinc, which gives a finely divided porous mass. The mercury compound is present to reduce corrosion coupling with zinc by raising the hydrogen overvoltage. This compound may be a reducible compound of mercury such as mercuric oxide or a functionally equivalent compound. It is also desirable to use an amount of a reducible zinc-active material as a charge reverse, e.g., zinc-oxide, based on the amount of oxidizable cathode material present to minimize hydrogen evolution from the zinc plate and possible cell rupture during charge and overcharge, in the case of the sealed cell.

The paste is preferably applied to the substrate so that its thickness of covering over the substrate including all surfaces and edges, leaves a body of metallic zinc remaining even after total discharge of the battery cell. It is preferred that there be no area of the pasted plate which is so thinly covered by the original zinc paste that the zinc oxide, which accumulates from the cell discharge reactions, forms a path from the substrate to the plate surface.

Once the paste has been applied to the substrate, such as by molding the paste on the substrate and allowing it to dry, or otherwise removing aqueous material as by applying heat, it is preferred that the surface of the plate be made relatively smooth to closely engage contiguous separator material in the cell package. It may be desirable to pressure mold the zinc active material to the substrate, followed by a polishing step to achieve necessary smoothness.

4. Electrolyte

The negative plate of the present invention is adapted to be used in the presence of a starved alkaline electrolyte environment, although not thereby limited. The electrolyte provides a source of hydroxyl ions which enter into the electro-chemical reactions at the plate. Preferred electrolytes include alkaline earth metal hydroxides such as calcium hydroxide and strontium hydroxide and alkali metal hydroxides, exemplified by sodium hydroxide, potassium hydroxide, lithium hydroxide, rubidium hydroxide and cesium hydroxide. Compatible mixtures of the preceding may be utilized. Most preferred because of economics and dissociation characteristics is potassium hydroxide, preferably in amounts from about 20 to about 45 weight percent solution, although somewhat less or greater concentrations may be employed.

The amount of electrolyte employed is critical for many of the secondary cells in which the zinc plate of the present invention is useful. Only enough electrolyte should be present to wet the cell and supply electrolytic conduction between the plates. A nearly dry or damp condition is preferred, though somewhat more or less wetting is operative. A balance should be obtained between adequate electrolytic conduction and minimum zinc dendritic growth. The starved electrolyte condition not only greatly reduces zinc dendritic growth (as evidenced by the excellent recyle life of these cells), but also eases oxygen recombination with the zinc plate during recharge of the cell in the case of sealed cells, and oxidation of any dendrites present. Normally, substantially all of the electrolyte within the cell is absorbed and retained within the pores and interstices of the separator layers and electrode plates. To insure proper controlled addition of electrolyte, the addition is advantageously done under the influence of vacuum.

5. Examples

The following examples are merely illustrative of certain embodiments of the invention and are not meant to limit it in any way. Accordingly, a number of battery cells are constructed having conventional sintered nickel oxide positive electrodes and pasted zinc negative plates. The paste consists of 90 weight percent zinc powder, 10 weight percent HgO, and a binder solution of aqueous polyvinyl alcohol. The paste mixture is applied to a number of different substrates, allowed to dry, leaving a structure having a porosity of about 55 percent. The cells consist of the negative and positive plates sandwiched about a two-layer separator consisting of cellulose paper next to the negative plate, and a porous non-woven nylon layer adjacent the positve plate. Twenty-five weight percent solution of potassium hydroxide is added and the cell sealed. The total cell configuration is so chosen that relatively low cell cycle life is obtained to allow ease of comparison of different cells.

In the first set of cells, plain steel is used as the negative plate sheet substrate. A number of these cells are tested and found to have an average charge/discharge cycle life of about 9.5 cycles. The same test is employed but according to the present invention with a number of cells using tin-plated steel substrates, yielding an average cycle life of about 28 cycles. Tin-plated copper substrates also yield a cycle life much greater than the plain steel substrates, and also better than a number of cells having amalgamated copper substrates. Lead-cooper substrates also show substantially improved results over uncoated substrates.

6. Modifications of the Invention

It should be understood that the invention is capable of a variety of modifications and variations which will be made apparent to those skilled in the art by a reading of the specification and which are to be included within the scope of the claims appended hereto.

What is claimed is:

1. A negative electrode plate for use in alkaline rechargeable battery cell comprising:
    an electrically conductive substrate material having a coating material uniformly thereon selected from the group consisting of a metal more noble than zinc and alloys thereof, said coating material having a high hydrogen over-voltage, and the oxidized form of said coating material having appreciable solubility in the alkaline electrolyte, which coated substrate is active over substantially its entire surface; and
    a porous zinc-active mixture, applied to the coated substrate, comprising from about 25 to about 99 weight percent zinc metal, and a material selected from the group consisting of mercury metal and a mercury compound in an amount to minimize corrosion coupling;
    said zinc metal present in an amount leaving a body of metallic zinc even after total discharge of the cell and equivalent to at least twice the stoichiometric amount required to react with the positive active material in the battery cell.

2. The electrode plate of claim 1 wherein the substrate consists essentially of a material selected from the group consisting of iron and steel.

3. The electrode plate of claim 1 wherein the coating material is comprised of tin.

4. The electrode plate of claim 1 wherein the coating material is amalgamated before the mixture is applied to the coated substrate.

5. The electrode plate of claim 1 wherein the zinc-active mixture comprises from about 35 to about 85 weight percent zinc metal, from about 10 to about 60 weight percent zinc oxide and a material selected from the group consisting of metallic mercury and mercuric oxide in an amount not to exceed 15 weight percent.

6. The electrode plate of claim 1 wherein the amount of zinc metal employed in the zinc mixture is from about 5 to about 10 times the stoichiometric amount required to react with the positive active material in the battery cell.

7. The electrode plate of claim 2 wherein the coating material is selected from tin and alloys thereof.

8. The electrode plate of claim 1 wherein the amount of zinc metal employed in the zinc mixture is at least four times the stoichiometric amount required to react with the positive active material in the battery cell.

* * * * *